United States Patent
Koo et al.

(10) Patent No.: US 7,098,285 B2
(45) Date of Patent: Aug. 29, 2006

(54) CATALYST OBTAINED BY PREPOLYMERIZATION OF POLYOLEFIN AND OLEFIN POLYMERIZATION METHOD USING THE SAME

(75) Inventors: Young-Soo Koo, Daejon (KR); Yong Chun, Daejon (KR); Young-Jun Lee, Daejon (KR); Ho-Sang Son, Seoul (KR); Ki-Su Ro, Daejon (KR)

(73) Assignee: Samsung Atofina Co., Ltd., Chungnam (KR)

( * ) Notice: Subject to any disclaimer, the term of this patent is extended or adjusted under 35 U.S.C. 154(b) by 311 days.

(21) Appl. No.: 10/450,692

(22) PCT Filed: Dec. 15, 2001

(86) PCT No.: PCT/KR01/02181

§ 371 (c)(1),
(2), (4) Date: Nov. 3, 2003

(87) PCT Pub. No.: WO02/48206

PCT Pub. Date: Jun. 20, 2002

(65) Prior Publication Data

US 2004/0063862 A1    Apr. 1, 2004

(30) Foreign Application Priority Data

Dec. 16, 2000  (KR)  ................. 2000-77394

(51) Int. Cl.
C08F 210/00  (2006.01)
C08F 4/42    (2006.01)

(52) U.S. Cl. ................. 526/348; 526/124.1; 526/124.2; 526/124.3; 526/904; 502/103; 502/115; 502/116; 502/125

(58) Field of Classification Search ................. 526/348, 526/124.1, 124.2, 124.3, 904; 502/103, 115, 502/116, 125
See application file for complete search history.

(56) References Cited

U.S. PATENT DOCUMENTS

| | | |
|---|---|---|
| 3,332,927 A | 7/1967 | Cottingham |
| 3,632,620 A | 1/1972 | Kober et al. |
| 3,642,746 A | 2/1972 | Kashiwa et al. |
| 3,642,772 A | 2/1972 | Haid et al. |
| 3,878,124 A | 4/1975 | Durand et al. |
| 3,899,477 A | 8/1975 | Altemore et al. |
| 3,953,414 A | 4/1976 | Galli et al. |
| 4,013,823 A | 3/1977 | Longi et al. |
| 4,069,169 A | 1/1978 | Toyota et al. |
| 4,071,672 A | 1/1978 | Kashiwa |
| 4,071,674 A | 1/1978 | Kashiwa et al. |
| 4,076,924 A | 2/1978 | Toyota et al. |
| 4,085,276 A | 4/1978 | Toyota et al. |
| 4,107,413 A | 8/1978 | Giannini et al. |
| 4,107,414 A | 8/1978 | Giannini et al. |
| 4,107,415 A | 8/1978 | Giannini et al. |
| 4,111,835 A | 9/1978 | Foschini et al. |
| 4,148,756 A | 4/1979 | Langer, Jr. |
| 4,156,063 A | 5/1979 | Giannini et al. |
| 4,157,435 A | 6/1979 | Toyota et al. |
| 4,158,642 A | 6/1979 | Langer, Jr. |
| 4,187,196 A | 2/1980 | Giannini et al. |
| 4,220,554 A | 9/1980 | Scata et al. |
| 4,226,963 A | 10/1980 | Giannini et al. |
| 4,235,747 A | 11/1980 | Leung |
| 4,263,169 A | 4/1981 | Scata et al. |
| 4,277,372 A | 7/1981 | Matlack |
| 4,315,835 A | 2/1982 | Scata et al. |
| 4,315,874 A | 2/1982 | Ushida et al. |
| 4,330,649 A | 5/1982 | Kioka et al. |
| 4,336,360 A | 6/1982 | Giannini et al. |
| 4,355,143 A | 10/1982 | Lassalle et al. |
| 4,380,507 A | 4/1983 | Noristi et al. |
| 4,384,983 A | 5/1983 | Hoff |
| 4,390,671 A | 6/1983 | Imai et al. |
| 4,399,054 A | 8/1983 | Ferraris et al. |
| 4,401,589 A | 8/1983 | Kioka et al. |
| 4,417,019 A | 11/1983 | Yamamoto et al. |
| 4,434,282 A | 2/1984 | Esneault |
| 4,439,540 A | 3/1984 | Cecchin et al. |
| 4,477,639 A | 10/1984 | Nielsen |
| 4,482,687 A | 11/1984 | Noshay et al. |
| 4,487,846 A | 12/1984 | Bailly et al. |
| 4,514,513 A | 4/1985 | Sato et al. |

(Continued)

FOREIGN PATENT DOCUMENTS

DE    2553104    6/1977

(Continued)

OTHER PUBLICATIONS

Wen et al. "Mechanics of Fluidization" Chemical Engineering Progress Symposium Series, 1962, vol. 62, 100-111.

(Continued)

Primary Examiner—Ling-Sui Choi
(74) Attorney, Agent, or Firm—Meyertons, Hood, Kivlin, Kowert & Goetzel, P.C.; Eric B. Meyertons

(57) ABSTRACT

The present invention provides a prepolymerized olefin polymerization catalyst and olefin polymerization method using the same. More particularly, the present invention provides a prepolymerized catalyst that is encapsulated with macromonomers produced by polymerizing olefin monomers with a vinyl-terminated polysiloxane compound in the presence of a solid titanium catalyst for olefin polymerization having been previously surface treated with silane compounds containing two or more vinyl groups, and a method for producing polyolefin having a high melt strength using the catalyst.

16 Claims, No Drawings

U.S. PATENT DOCUMENTS

| | | |
|---|---|---|
| 4,518,706 A | 5/1985 | Gessell |
| 4,529,716 A | 7/1985 | Banzi et al. |
| 4,579,833 A | 4/1986 | Collomb et al. |
| 4,613,655 A | 9/1986 | Longi et al. |
| 4,614,727 A | 9/1986 | Longi et al. |
| 4,615,831 A | 10/1986 | Kanno et al. |
| 4,642,328 A | 2/1987 | Morterol et al. |
| 4,673,719 A | 6/1987 | Kioka et al. |
| 4,729,854 A | 3/1988 | Miyata et al. |
| 4,761,392 A | 8/1988 | Shiga et al. |
| 4,777,639 A | 10/1988 | Whitehouse |
| 4,806,433 A | 2/1989 | Sasaki et al. |
| 4,816,433 A | 3/1989 | Terano et al. |
| 4,829,037 A | 5/1989 | Terano et al. |
| 4,843,049 A | 6/1989 | Invernizzi et al. |
| 4,847,227 A | 7/1989 | Murai et al. |
| 4,847,639 A | 7/1989 | Sugata et al. |
| 4,866,022 A | 9/1989 | Arzoumanidis et al. |
| 4,912,074 A | 3/1990 | Miro |
| 4,946,816 A | 8/1990 | Cohen et al. |
| 4,952,649 A | 8/1990 | Kioka et al. |
| 4,962,167 A | 10/1990 | Shiraishi et al. |
| 4,970,186 A | 11/1990 | Terano et al. |
| 4,978,648 A | 12/1990 | Barbe et al. |
| 4,988,656 A | 1/1991 | Arzoumanidis et al. |
| 4,990,479 A | 2/1991 | Ishimaru et al. |
| 5,006,499 A | 4/1991 | Daire |
| 5,013,702 A | 5/1991 | Arzoumanidis et al. |
| 5,021,382 A | 6/1991 | Malpass, Jr. |
| 5,059,570 A | 10/1991 | Bailly et al. |
| 5,061,667 A | 10/1991 | Murata et al. |
| 5,064,798 A | 11/1991 | Chang |
| 5,081,090 A | 1/1992 | Arzoumanidis et al. |
| 5,104,838 A | 4/1992 | Fujita et al. |
| 5,106,807 A | 4/1992 | Morini et al. |
| 5,124,297 A | 6/1992 | Arzoumanidis et al. |
| 5,130,284 A | 7/1992 | Terano et al. |
| 5,134,104 A | 7/1992 | Sasaki et al. |
| 5,175,332 A | 12/1992 | Chatterton et al. |
| 5,182,245 A | 1/1993 | Arzoumanidis et al. |
| 5,218,052 A | 6/1993 | Cohen et al. |
| 5,244,996 A | 9/1993 | Kawasaki et al. |
| 5,346,872 A | 9/1994 | Menon et al. |
| 5,419,116 A | 5/1995 | Rast et al. |
| 5,439,995 A | 8/1995 | Bailly et al. |
| 5,455,316 A | 10/1995 | Tsutsui et al. |
| 5,459,116 A | 10/1995 | Ro et al. |
| 5,498,770 A | 3/1996 | Hosaka et al. |
| 5,502,128 A | 3/1996 | Flores et al. |
| 5,585,317 A | 12/1996 | Sacchetti et al. |
| 5,587,436 A | 12/1996 | Klimek et al. |
| 5,587,440 A | 12/1996 | Ehlers et al. |
| 5,618,886 A | 4/1997 | Shinozaki et al. |
| 5,629,390 A | 5/1997 | Nishimura et al. |
| 5,643,845 A | 7/1997 | Tajima et al. |
| 5,661,095 A * | 8/1997 | Meverden et al. .......... 502/102 |
| 5,696,044 A | 12/1997 | Zakharov et al. |
| 5,726,261 A | 3/1998 | Sacchetti et al. |
| 5,780,378 A | 7/1998 | Toida et al. |
| 5,798,424 A | 8/1998 | Kong et al. |
| 5,817,591 A | 10/1998 | Shamshoum et al. |
| 5,844,046 A | 12/1998 | Ohgizawa et al. |
| 5,849,654 A | 12/1998 | Fushimi et al. |
| 5,849,655 A | 12/1998 | Shamshoum et al. |
| 5,869,418 A | 2/1999 | Iiskola et al. |
| 5,877,265 A | 3/1999 | Toida et al. |
| 5,880,056 A | 3/1999 | Tsutsui et al. |
| 5,936,049 A | 8/1999 | Kojoh et al. |
| 5,948,872 A | 9/1999 | Kioka et al. |
| 5,965,478 A | 10/1999 | Goto et al. |
| 5,968,862 A | 10/1999 | Abbott et al. |
| 6,028,149 A | 2/2000 | Luciani et al. |
| 6,034,025 A | 3/2000 | Yang et al. |
| 6,066,702 A | 5/2000 | Ro et al. |
| 6,111,038 A | 8/2000 | Kioka et al. |
| 6,114,276 A | 9/2000 | Kong et al. |
| 6,214,759 B1 | 4/2001 | Chang et al. |
| 6,218,331 B1 | 4/2001 | DeMaio et al. |
| 6,235,854 B1 | 5/2001 | Kioka et al. |
| 6,291,385 B1 | 9/2001 | Lee et al. |
| 6,323,150 B1 | 11/2001 | Kojoh et al. |
| 6,482,764 B1 | 11/2002 | Chang et al. |
| 6,521,560 B1 | 2/2003 | Kojoh et al. |
| 6,537,942 B1 | 3/2003 | Shinozaki et al. |
| 6,559,250 B1 | 5/2003 | Ro et al. |
| 2001/0031694 A1 | 10/2001 | Yang et al. |
| 2002/0037980 A1 | 3/2002 | Yang et al. |
| 2002/0045537 A1 | 4/2002 | Yang et al. |
| 2002/0120079 A1 | 8/2002 | Ro et al. |

FOREIGN PATENT DOCUMENTS

| | | |
|---|---|---|
| DE | 3636060 | 5/1988 |
| EP | 0131832 | 7/1984 |
| EP | 0350170 | 1/1990 |
| EP | 0385765 | 9/1990 |
| EP | 0602922 | 6/1994 |
| EP | 0606125 | 7/1994 |
| EP | 0607703 | 7/1994 |
| EP | 0669347 | 8/1995 |
| EP | 0391336 | 6/1999 |
| GB | 1335887 | 10/1973 |
| GB | 1492618 | 1/1975 |
| GB | 1577643 | 10/1980 |
| JP | 51136625 | 11/1976 |
| JP | 52111528 | 9/1977 |
| JP | 59145206 | 8/1984 |
| JP | 61055103 | 3/1986 |
| JP | 61268704 | 11/1986 |
| JP | 62081405 | 4/1987 |
| JP | 63199703 | 8/1988 |
| JP | 63-191811 | 9/1988 |
| JP | 63308003 | 12/1988 |
| JP | 04 293910 | * 10/1992 |
| JP | 06-340711 | 5/1993 |
| JP | 07-330675 | 8/1995 |
| JP | 09176226 | 7/1997 |
| JP | 63-54004 | 10/1998 |
| KR | 1020010084520 | 9/2001 |
| WO | WO 00/73355 | 7/2000 |
| WO | WO 01/32718 | 5/2001 |
| WO | WO 01/78687 | 10/2001 |
| WO | WO 02/38619 | 5/2002 |
| WO | WO 02/38620 | 5/2002 |
| WO | WO 02/38622 | 5/2002 |
| WO | WO 02/38623 | 5/2002 |
| WO | WO 02/38624 | 5/2002 |
| WO | WO 02/051882 | 7/2002 |
| WO | WO 02/051933 | 7/2002 |
| WO | WO 02/051934 | 7/2002 |
| WO | WO 02/052059 | 7/2002 |
| WO | WO 03/000747 | 3/2003 |

OTHER PUBLICATIONS

Edelmann, "N-silylated benzamidines: versatile building blocks in main group and coordination chemistry," Coordination Chemistry Reviews, vol. 137, 1994, pp. 403-481.

Stokes et al., "Reactions of Cobaloxime Anions and/or Hydrides with Enynes as a New, General Route to 1, 3- and 1,2-Dienylcobaloxime Complexes," Organometallics, 1996, vol. 15, pp. 2624-2632.

Zhou et al., "Synthesis and Structure of Novel Bridged Dinuclear Indium Complexes," Inorg. Chem., 1996, vol. 35, pp. 1423-1424.

Tinkler et al., "Polymerisation of ethene by the novel titanium complex [Ti(Me3SiNCH2CH2NsiMe3)CI2]; a metallocene analogue," Chem. Commun., 1996, pp. 2623-2624.

Linden et al., "Polymerization of a-Olefins and Butadiene and Catalytic Cyclotrimerization of 1-Alkynes by a New Class of Group IV Catalysts. Control of Molecular Weight and Polymer Microstructure via Ligand Tuning in Sterically Hindered Chelating Penoxide Titanium and Zirconium Species," J. Am. Chem. Soc., 1995, vol. 117, pp. 3008-3021.

Zhou et al., "Bulky Amidinate Complexes of Tin(IV). Synthesis and Structure of Sn(RNC(R')NR)2C22 (R= Cyclohexyl, R'=H, Me; R=SiMe3, R'=tBu)," Inorg. Chem., 1997, vol. 36, pp. 501-504.

Averbuj et al. "Stereoregular Polymerization of a-Olefins Catalyzed by Chiral Group 4 Benzamidinate Complexes of C1 and C3 Symmetry" J. Am. Chem. Soc,1998, vol. 120, 8640-8646.

International Search Report PCT/KR01/02181, Mar. 21, 2002.

* cited by examiner

CATALYST OBTAINED BY PREPOLYMERIZATION OF POLYOLEFIN AND OLEFIN POLYMERIZATION METHOD USING THE SAME

BACKGROUND OF THE INVENTION

1. Field of the Invention

The present invention relates to a prepolymerized catalyst obtained by prepolymerization of olefin and a method for olefin polymerization using the same. More specifically, the present invention relates to a prepolymerized olefin polymerization catalyst prepared in such a way that high molecular weight macromonomers are encapsulated around the catalyst and to a method of olefin polymerization using the prepolymerized catalyst which produces polyolefin with a high melt strength.

2. Description of the Related Art

Compared to polyethylene, conventional linear polypropylenes are not suitable for melt processing (e.g., foaming, heat molding, extrusion coating, etc.) due to a low melt strength. However, a high melt strength can be achieved by introducing long chain branching into the polypropylene. Long chain branching reduces attractive forces between macromolecular chains during processing and acts to increase melt strength by crosslinking with neighboring chains during molding processes. Production of high melt strength polyolefins with long chain branching typically includes the step of forming polyolefin radicals exiting a polymerization reaction vessel by electronic radiation or by a reaction extrusion method followed by reacting these radicals to introduce long chain branching into the linear structure. If a polymerization method could be developed that was capable of directly polymerizing olefins to form a high melt strength polyolefin useful as a molding material, it is expected that the use of polyolefins as molding materials could be expanded.

SUMMARY OF THE INVENTION

In order to produce a polyolefin with a high melt strength as a polymerization product, the present invention provides a prepolymerized olefin polymerization catalyst and a method for polymerizing olefin using the catalyst. The prepolymerized olefin polymerization catalyst of the present invention has functionalized active sites that can introduce long chain branching into the polymer resulting in high melt strength.

The present invention relates to a catalyst encapsulated with macromonomers (hereinafter referred to as 'prepolymerized catalyst'), which is capable of forming branches in the olefin polymers, prepared by prepolymerization of a solid titanium olefin polymerization catalyst with olefin macromonomer/multifunctional compounds and to a method for using the prepolymerized catalyst to produce polyolefins exhibiting high melt strength.

The term "polymerization" used herein includes the process of copolymerization of an olefin with other α-olefins to form a copolymer as well as the process of polymerization of an olefin to form a homopolymer.

The prepolymerized catalyst of the present invention is prepared by first surface treating a solid titanium olefin polymerization catalyst with silane compounds having two or more vinyl groups. Prepolymerization reactions are then conducted by combining the surface treated catalyst with a mixture of olefin monomer and vinyl-terminated polysiloxane. The catalyst is encapsulated by polymerizing the macromonomer around the catalyst. Compared to a non-encapsulated solid titanium catalyst, the prepolymerized catalyst, according to the present invention, exhibits good catalyst activity. The prepolymerized catalyst is capable of producing a polymer having a broad molecular weight distribution and high stereoregularity and is also capable of forming long-chain branching in polyolefins.

Any conventional solid titanium olefin polymerization catalyst may be used as the solid titanium catalyst component in the preparation of the prepolymerized catalyst of the present invention. The prepolymerized catalyst may be prepared by various methods. For example, the catalyst may be prepared by directly contacting a magnesium compound free of reducibility with a titanium compound in a liquid medium in the presence of electron donors not having active hydrogen. The catalyst may also be prepared by contacting a magnesium compound and titanium catalyst in the absence of electron donors having no active hydrogen followed by reacting the catalyst with an electron donor.

The most common methods for preparation of the solid titanium catalyst used in the preparation of the prepolymerized catalyst of the present invention include the steps of contacting a magnesium compound with a titanium compound that has at least one or more halogen atoms, and if necessary, treating the products thus obtained with an electron donor. Some of the above methods are described in German Patent Nos. 2,230,672, 2,504,036, 2,553,104, and 2,605,922, and Japanese Patent Nos. 51-28189; 51-136625, and 52-87486. In addition, a method for preparing solid titanium compounds containing electron donors from titanium compounds in a liquid state combined with magnesium compound solutions is described in Japanese Patent No. 79-40293.

The solid titanium catalyst used in the preparation of the prepolymerized catalyst of the present invention may be a conventional Ziegler-Natta catalyst, such as described in U.S. Pat. Nos. 4,482,687, 4,277,372, 3,642,746, 3,642,772, 4,158,642, 4,148,756, 4,477,639, 4,518,706, 4,946,816, 4,866,022, 5,013,702, 5,124,297, 4,330,649, European Patent No. 131,832, and Japanese Patent Shou 63-54004.

DETAILED DESCRIPTION OF THE PREFERRED EMBODIMENTS

One preferred method for preparing the solid titanium catalyst, which is also used in the examples of the present invention, forms a magnesium-supported solid titanium catalyst complex by:

(i) preparing a solution by dissolving the magnesium compound having no reducibility in an electron donor;
(ii) reacting the solution of step (i) with transition metal compounds, silicon compounds, tin compounds, or a mixture thereof thereby precipitating solid particles; and
(iii) reacting the precipitated solid particles with a titanium compound and an electron donor followed by washing with hydrocarbon thereby preparing solid catalyst particles with controlled particle types.

The magnesium compounds having no reducibility used in the preparation of the solid titanium catalyst described above include magnesium halides such as magnesium chloride, magnesium bromide, magnesium iodide, and magnesium fluoride; alkoxy magnesium halides such as methoxy magnesium chloride, ethoxy magnesium chloride, isopropoxy magnesium chloride, butoxy magnesium chloride, and octoxy magnesium chloride; aryloxy magnesium halides such as phenoxy magnesium chloride and methylphenoxy magnesium chloride; alkoxy magnesium such as ethoxy magnesium, isopropoxy magnesium, butoxy magnesium, and octoxy magnesium; aryloxy magnesium such as phenoxy magnesium and dimethyl magnesium; and magnesium salts of carboxylic acids such as lauryl magnesium and stearic acid magnesium.

The magnesium compounds may be used as a complex with other metals, with a mixture of other metals, or as mixture of two or more magnesium compounds. Preferably, the magnesium compounds are magnesium compounds containing hydrogen, magnesium chloride, alkoxy magnesium chloride, preferably alkoxy magnesium chloride having $C_1$–$C_{14}$ alkoxy groups, and aryloxy magnesium chloride, preferably aryloxy magnesium chloride having $C_5$–$C_{20}$ aryloxy groups.

Generally, the above-mentioned compounds may be represented by a simple chemical formula; however, depending on the method of preparation, the compound may not be describable by a simple chemical formula. Such compounds may generally be considered to be mixtures of the above-mentioned compounds. For example, compounds produced by a reaction of magnesium compounds with alcohols or phenols in the presence of a halosilane, phosphate pentachloride, or thionyl chloride, by pyrolysis of a Grignard reagent, or by a degradation method using hydroxyl groups, carbonyl ester bonds, ether bonds, or similar kinds of compounds are considered to be mixtures depending on the reagents or degree of reaction. These compounds may also be used in the present invention.

The magnesium compounds may be reacted with one or more electron donors that may be selected from the groups including alcohols, organic carboxylic acids, aldehydes, amines, and/or a mixture thereof, thereby producing a solution of magnesium compounds. A solution of magnesium compounds may be produced by mixing the magnesium compounds with hydrocarbon solvent containing electron donors followed by heating. Examples of hydrocarbon solvents include aliphatic hydrocarbons such as pentane, hexane, heptane, octane, decane, dodecane, and kerosene; cyclic hydrocarbons such as cyclopentane, methylcyclopentane, cyclohexane, and methylcyclohexane; aromatic hydrocarbons such as benzene, toluene, xylene, ethylbenzene, cumene, and simene; and halo hydrocarbons such as dichloroethane, dichloropropane, dichloroethylene, trichloroethylene, carbon tetrachloride, and chlorobenzene.

When alcohol is used as an electron donor in step (i) of preparing a solution of magnesium compounds having hydrogen in a hydrocarbon solvent, a suitable alcohol to magnesium compound molar ratio may be at least 0.5, preferably about 1.0 to 20, and more preferably about 2.0 to 10. If the hydrocarbon solvent used is an aromatic hydrocarbon, an alcohol to magnesium molar ratio of about 20, or more preferably, about 1.5 to 12 may be used.

When the magnesium compound is a magnesium compound containing halogen and the hydrocarbon solvent is aliphatic or cyclic and an alcohol is used as the electron donor, the alcohol to magnesium molar ratio to be used depends on the carbon chain length of the alcohol. If the alcohol has 6 or more carbon atoms, the alcohol to magnesium ratio may be at least 0.5 and preferably 1 or higher. If the alcohol has 5 or fewer carbons, the alcohol to magnesium ratio may be at least 15. The catalyst produced using an alcohol with 5 or fewer carbons may also exhibit a lower activity than the one produced using an alcohol with 6 or more carbons.

The reaction of contacting magnesium compounds with electron donor alcohols may be conducted in a medium of hydrocarbons. These contacting reactions may be performed in a range of temperatures, for example, from about 30° C. to about 200° C., or more preferably, from about 60° C. to about 150° C. for about 15 minutes to about 5 hours, or more preferably, for about 30 minutes to about 3 hours.

Examples of alcohols used as electron donors in step (i) include aliphatic alcohols having at least 6 carbon atoms, preferably 6 to 20 carbon atoms, such as 2-methylpentanol, 2-ethylbutanol, n-heptanol, n-octanol, 2-ethylhexanol, decanol, dodecanol, tetradecyl alcohol, undecanol, oleyl alcohol, and stearyl alcohol; cyclic alcohols such as cyclohexanol and methylcyclohexanol; and aromatic alcohols such as benzyl alcohol, methylbenzyl alcohol, isopropylenebenzyl alcohol, α-methylbenzyl alcohol, and α,α-dimethylbenzyl alcohol. Examples of alcohols having 5 or fewer carbon atoms include methanol, ethanol, propanol, butanol, ethyleneglycol, and methylcarbitol.

The solutions of magnesium compounds thus obtained may be reacted with transition metal compounds such as titanium compounds, silicon compounds, tin compounds, or mixtures thereof resulting in a precipitation of a globular solid material (step (ii)). Suitable amounts of transition metal compounds, silicon compounds, tin compounds, or mixtures thereof may lie in the range of 0.1 mole to 20 moles, or more preferably in the range of 0.1 mole to 10 moles, or even more preferably in the range of 0.2 mole to 2 moles per mole of magnesium compound.

The shape and size of the magnesium carrier precipitated from solution in step (ii) varies according to the reaction conditions. The temperature of the contacting reaction may be in the range of about −70° C. to about 200° C. However, it is preferable that this reaction be conducted in a temperature range of about 20° C. to about 150° C. If the contacting temperature is too high, precipitation does not occur.

The solid titanium catalyst complex is produced by reacting the precipitated magnesium compound with titanium compounds and electron donors (step (iii)). Examples of electron donors used in this step include electron donors having an oxygen atom such as water, alcohols, phenols, ketones, aldehydes, carboxylic acids, esters, and acid amides; electron donors having a nitrogen atom such as ammonia, amines, nitriles, and isocyanic acid salts; more particularly alcohols having from 1 to 18 carbon atoms such as methanol, ethanol, propanol, pentanol, hexanol, octanol, dodecanol, octadecyl alcohol, benzyl alcohol, phenylethyl alcohol, cumyl alcohol, and isopropylbenzyl alcohol; ketones having 6 to 15 carbon atoms which are capable of having lower phenyl groups such as phenol, cresol, xylene, ethylphenol, propylphenol, cumylphenol, and naphthol; aldehydes having 2 to 15 carbon atoms such as acetaldehyde, propionylaldehyde, octylaldehyde, benzaldehyde, toluyl aldehyde, and naphthaldehyde; organic acid esters having 2 to 18 carbon atoms such as methylformate, methylacetate, vinylacetate, propylacetate, octylacetate, cyclohexylacetate, ethylpropionate, methylbutyrate, ethylvalerate, methylchloroacetate, ethyldichloroacetate, methylmethacrylate, ethylcrotonate, ethylcyclohexylcarboxylate, phenylsalicylate, methyltoluate, ethyltoluate, amyltoluate, ethylethylsalicylate, methylanistate, ethylanistate, ethylethoxysalicylate, γ-butyrolactone, δ-butyrolactone, coumarine, phthalate, cyclohexylacetate, methylvalerate, ethylcitrate, phenylbenzoate, propylbenzoate, butylbenzoate, cyclohexylbenzoate, and ethylene carbonate; acid halides having 2 to 15 carbon atoms such as acetylchloride, benzylchloride, toluylchloride, and anisylchloride; ethers such as methylether, ethylether, isopropylether, butylether, amylether, tetrahydrofuran, anisole, and diphenylether; amines such as methylamine, ethylamine, diethylamine, tributylamine, piperidine, tribenzylamine, aniline, pyridine, pynoline, and tetramethylethylenediamine; nitriles such as acetonitrile, benzonitrile, and tolunitrile; and compounds of aluminum, silicon, tin, etc. having the above-mentioned functional groups in the molecules. Additionally, ester derivatives of monoethyleneglycol(MEG), diethyleneglycol(DEG), triethyleneglycol(TEG), polyethyleneglycol(PEG), monopropyleneglycol(MPG), and dipropyleneglycol(DPG) with acetate, propionate, n- and isobutyrate, benzoate, toluate, etc. may preferably be used. Examples of these benzoate ester derivatives include monoethyleneglycolmonobenzoate, monoethyleneglycoldibenzoate, diethyleneglycolmonobenzoate, diethyleneglycoldibenzoate, triethyleneglycolmonobenzoate, triethyleneglycoldibenzoate, monopropyleneglycolmonobenzoate, dipropyleneglycolmonobenzoate, dipropyleneglycoldibenzoate, tripropyleneglycolmonobenzoate, etc. Although mixtures of two or more of these electron donors may be used, ester derivatives of aromatic compounds are preferred. However, these electron donors may not always be needed as starting materials and may be used as adducts of other compounds or complexes. The amount of the electron donor can be correspondingly changed, and may be used, preferably, in the range of about 0.001 mole to about 10 moles, or more preferably, in the range of about 0.01 mole to about 5 moles, or most preferably, in the range of about 0.05 mole to about 1 mole, per mole of the magnesium compound.

Examples of the titanium compounds in solution to be reacted with the magnesium compounds in the solid particulate state in step (iii) are preferably tetravalent titanium compounds of the formula $Ti(OR)_m X_{4-m}$ (wherein R represents a hydrocarbon group having 1 to 10 carbon atoms, X represents a halogen atom, and m is a number represented by $0 \leq m \leq 4$). Examples of these titanium compounds include titanium tetrahalides such as $TiCl_4$, $TiBr_4$, and $TiI_4$; titanium trihalides such as $Ti(OCH_3)Cl_3$, $Ti(OC_2H_5)Cl_3$, $Ti(OC_4H_9)Cl_3$, $Ti(OC_2H_5)Br_3$, and $Ti(O(i-C_2H_5))Br_3$; alkoxy titanium dihalides such as $Ti(OCH_3)_2Cl_2$, $Ti(OC_2H_5)_2Cl_2$, $Ti(OC_4H_9)_2 Cl_2$, and $Ti(OC_2H_5)_2Br_2$; alkoxy titanium monohalides such as $Ti(OCH_3)_3Cl$, $Ti(OC_2H_5)_3Cl$, $Ti(OC_4H_9)_3Cl$, and $Ti(OC_2H_5)_3Br$; tetraalkoxy titanium such as $Ti(OCH_3)_4$, $Ti(OC_2H_5)_4$, $Ti(OC_4H_9)_4$; and mixtures thereof. Among these, the halogen-containing titanium compounds, particularly titanium tetrahalides, more particularly, titanium tetrachlorides are preferred.

These titanium compounds may be used in amounts of at least 1 mole, commonly 3 moles, to about 200 moles, or preferably, about 5 moles to 100 moles per mole of magnesium compound. When contacting magnesium compounds with titanium compounds in solution, it is preferable that a low reaction temperature be maintained during mixing, and then gradually increased. For example, the contacting reaction of the two compounds may be performed in a temperature range of about −70° C. to about 50° C. so that the reaction does not proceed too rapidly. The reaction temperature may then be gradually increased and maintained for a sufficient time at about 50° C. to about 150° C. The products are washed with hydrocarbons of the type to be used in the polymerization reaction until free titanium is no longer detected. According to this preparation method, a solid titanium catalyst with a high activity may be prepared.

It is preferred that the solid titanium catalyst used in the present invention have a halogen to titanium molar ratio of about 4 or more and that the catalyst does not substantially liberate free titanium compounds by washing with hexane at room temperature. Preferred examples of solid titanium catalysts are those in which the halogen to titanium molar ratio is about 4 or more, more preferably about 5 or more, and most preferably about 8 or more, the magnesium to titanium molar ratio is about 3 or more, more preferably about 5 to 50, and the electron donor to titanium molar ratio is about 0.2 to about 6, more preferably about 0.4 to about 3, and even more preferably about 0.8 to about 2. Furthermore, the catalyst has a specific area of about 10 $m^2/g$ or more, more preferably 50 $m^2/g$ or more, and most preferably 100 $m^2/g$ or more. It is preferred that the X-ray spectrum of the solid titanium catalyst represent amorphous properties irrespective of the starting magnesium compounds or at least a more amorphous state than common commercial-grade magnesium dihalides.

To prepare the prepolymerized catalyst according to the present invention, the surface of the solid titanium catalyst complex, as described above, is treated with silane compounds having two or more vinyl groups. Examples of divinyl silane compounds used at this stage include divinyl dimethyl silane, divinyl diphenyl silane, divinyl diethyl silane, divinyl diisobutyl silane, and divinyl silane dihydride. When used as the surface treatment, these compounds may be used in an amount of 2 moles to 200 moles per mole of magnesium compound. At silane compound concentrations of less than 2 moles per mole of magnesium compound, long chains cannot be formed effectively. At silane compound concentrations of over 200 moles per mole of magnesium compound, a substantial reduction in catalyst activity makes it impossible to use the catalyst in the polymerization process. The reaction between the solid titanium catalyst and the compounds for surface treatment is performed by contacting the compounds at about −70° C. to about 50° C. The reaction may be performed in the presence or absence of solvent.

The prepolymerization reaction is then performed using the surface-treated solid titanium catalyst. The prepolymerization process is performed by reacting olefin monomers with a vinyl-terminated polysiloxane in a temperature range of about −50° C. to about 50° C. in the presence of the surface-treated solid titanium catalyst, aluminum alkyl, and electron donors. Macromonomers are polymerized onto the surface of the catalyst through the simultaneous reaction of vinyl compounds attached to the catalyst surface, olefin monomers, and vinyl-terminated polysiloxane. The macromonomers, composed of olefins, silane compounds having double bonds, and vinyl-terminated polysiloxane compounds, encapsulate the catalyst surface. The macromonomer may contain about 1 to 99 percent by weight olefins, about 0.01 to 10 percent by weight vinyl-terminated polysiloxane, and about 0.001 to 1 percent by weight silane compounds. Preferably, the compounds may contain about 70 to 95 percent by weight olefins, about 0.1 to 5 percent by weight vinyl-terminated polysiloxane, and about 0.01 to 1 percent by weight silane compounds. Examples of olefin monomers used at this stage include one or more compounds selected from the group including ethylene, propylene, 1-butene, 1-hexene, 1-octene, and vinyl-terminated polysiloxanes which may have the structure:

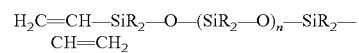

(n=0–100, R=alkyl, alkoxy, hydrogen, or phenyl)

The macromonomers, polymerized around the catalyst, are reacted with propylene monomers during the main polymerization reaction thereby forming long chain branches or networks. The molecular weight of these macromonomers is preferably in the range of 500 to 100,000, and more preferably in the range of 1000 to 10,000.

The prepolymerized catalyst, thus produced according to the present invention, is useful for polymerization of olefins such as ethylene, propylene, 1-butene, 3-methyl-1-butene, 4-methyl-1-butene, vinylcycloalkane, or cycloalkane. Specifically, these catalysts are useful for polymerization of α-olefins having 3 or more carbon atoms, copolymerization between these compounds, copolymerization between these compounds having 20 mole percent or less ethylene, and copolymerization between polyunsaturated compounds such as conjugated or nonconjugated dienes.

The method for olefin polymerization, according to the present invention, includes polymerizing or copolymerizing olefins in the presence of a catalyst system including the following components (a), (b), and (c):

(a) a prepolymerized catalyst produced by the method described above that may include a macromonomer-encapsulated, prepolymerized catalyst obtained by prepolymerizing olefin monomer and diene compounds with solid titanium compounds supported on magnesium compounds, titanium compounds, electron donors, and silane compounds having 2 or more double bonds;

(b) organometallic compounds containing Group I or Group III metals of the Periodic Table; and (c) external electron donors.

Examples of the organometallic compounds used as cocatalysts in the polymerization method of the present invention are trialkylaluminum compounds such as triethylaluminum and tributylaluminum; trialkenylaluminum compounds such as triisoprenylaluminum; partially alkoxylated alkylaluminum compounds (for example, dialkylaluminumalkoxides such as diethylaluminumethoxide and dibutylaluminumbutoxide, and alkylaluminum sesquialkoxides such as ethylaluminum sesquiethoxide and butylaluminum sesquiethoxide); alkylaluminum halide compounds such as ethylaluminum dichloride, propylaluminum dichloride, and butylaluminum dibromide; partially halogenated aluminum compounds; aluminum hydride; dialuminum hydrides such as diethylaluminum hydride; and partially alkoxylated halogenated alkylaluminum compounds such as butylaluminum butoxychloride and ethylaluminum ethoxybromide. Among these, trialkylaluminum compounds are preferred.

External electron donors used in the polymerization method of the present invention may be external electron donors conventionally used in the polymerization of olefins. Such external electron donors are generally used to optimize catalytic activities and polymer product stereoregularities. Examples of external electron donors, useable in the present invention, are organic compounds containing oxygen, silicon, nitrogen, sulfur, and/or phosphorus atoms such as organic acids, organic acid anhydrides, organic acid esters, alcohols, ethers, aldehydes, ketones, silanes, amines, amine oxides, amides, diols, phosphate esters, and mixtures thereof. Particularly preferable external electron donors include organic silicon compounds having alkoxy groups, i.e., alkoxy silane. Examples of these compounds include aromatic silanes such as diphenyldimethoxy silane, phenyltrimethoxy silane, phenylethyldimethoxy silane, and phenylmethyldimethoxy silane; aliphatic silanes such as isobutyltrimethoxy silane, diisobutyldimethoxy silane, diisopropyldimethoxy silane, di-t-butyldimethoxy silane, t-butyltrimethoxy silane, cyclohexylmethyldimethoxy silane, dicyclopentyldimethyldimethoxy silane, dicyclohexyldimethoxy silane, 2-novonantriethoxy silane, 2-novonanmethyldimethoxy silane, and vinyltriethoxy silane; and mixtures thereof. Branched alkyl dialkoxy silane compounds such as diisobutyl dimethoxy silane and cycloalkyl dialkoxy silane compounds such as dicyclopentyl dimethoxy silane are preferred. The above compounds may be used alone or as mixtures.

When the polymerization method of the present invention is applied to liquid state polymerizations, inert solvents such as hexane, heptane, or kerosene may be used as a reaction medium. In addition, olefin itself may also be used as a reaction medium. In the case of a liquid state polymerization process, a preferred concentration of the prepolymerized catalyst in the polymerization reaction system is from about 0.001 mmol to about 5 mmol Ti per liter of solvent, and more preferably from about 0.001 mmol to about 0.5 mmol Ti per liter of solvent. In the case of a gaseous state polymerization process, a preferred concentration of prepolymerized catalyst in the reaction system is from about 0.001 mmol to about 5 mmol Ti per liter of polymerization volume, more preferably from about 0.001 mmol to about 1.0 mmol Ti per liter of polymerization volume, and most preferably from about 0.01 mmol to about 0.5 mmol Ti per liter of polymerization volume.

A preferred concentration of organometallic compound in the reaction system is from about 1 mole to about 2,000 moles per mole Ti in the catalyst, and more preferably from about 5 moles to about 500 moles per mole of Ti in the catalyst. The concentration of external electron donors may be from about 0.001 mole to about 10 moles per mole of organometallic compound, preferably from about 0.01 mole to about 2 moles per mole of organometallic compound, and more preferably from about 0.05 mole to about 1 mole per mole of organometallic compound.

Olefin polymerization or copolymerization, in the presence of the catalyst system of the present invention, is conducted in a manner similar to olefin polymerization using a conventional Ziegler-type catalyst. Specifically, the polymerization or copolymerization is conducted substantially in the absence of oxygen or water. The polymerization of olefins may preferably be conducted at a temperature of about 20° C. to about 200° C., or more preferably from about 50° C. to about 180° C. and at a pressure of about atmospheric pressure to about 100 atm, or more preferably from about 2 atm to about 50 atm. The polymerization may be performed as a batch process, as a semi-batch process, or as a continuous process, or it may be conducted in multiple steps having different reaction conditions.

The following examples and comparative examples illustrate the present invention more specifically, but the present invention is not limited thereto.

EXAMPLE 1

Preparation of the Prepolymerized Catalyst

Step 1: Preparation of the Magnesium Compound Solution

A mixture of 15 g $MgCl_2$, 4.2 g $AlCl_3$, and 550 ml toluene was added to a 1.0-liter reaction vessel equipped with a mechanical agitator and purged with nitrogen. The reaction vessel was agitated at 400 rpm while adding 30 ml tetrahydrofuran, 28 ml butanol, 1.4 ml ethanol, 1.5 ml silicon tetraethoxide, and 3.0 ml tributylphosphate. The reaction vessel temperature was raised to 105° C. and maintained for 4 hours. A homogeneous solution was obtained after completion of the reaction and the reaction vessel was cooled to room temperature.

Step 2: Preparation of Solid Support Materials

The magnesium solution prepared in Step 1 was transferred to a 1.6-liter reaction vessel maintained at a temperature of 13° C. The agitation speed was set at 350 rpm and 15.5 ml TiCl$_4$ was added to the reactor. The reaction temperature was raised to 90° C. and the reaction was allowed to continue for 1 hour at 90° C. Upon completion of the reaction, the agitation was stopped and the precipitated solid support material was separated from the supernatant and washed twice with 75 ml of toluene.

Step 3: Preparation of the Solid Titanium Catalyst 100 ml toluene and 100 ml TiCl$_4$ were added to the solid support material in the reaction vessel. The temperature of the reaction vessel was raised to 110° C. and maintained for 1 hour under agitation. After one hour, agitation was stopped and the solid support material was separated from the supernatant. 100 ml toluene and 100 ml TiCl$_4$ were added to the reaction vessel followed by 2.9 ml diisophthalate. The temperature of the reaction vessel was raised to 120° C. and agitated for 1 hour. After 1 hour, agitation was stopped and the solid was separated from the supernatant. 100 ml toluene was added to the reaction vessel and the temperature was lowered to 70° C. The reaction vessel was then agitated for 30 minutes. After 30 minutes, agitation of the reaction vessel was stopped and the solid was separated from the supernatant. The solid titanium catalyst was prepared by adding 100 ml TiCl$_4$ followed by agitating for 30 minutes at 70° C.

Step 4: Surface Treatment of the Solid Titanium Catalyst

The solid titanium catalyst prepared in Step 3 was washed 5 times with 75 ml of purified hexane. 500 ml hexane and 50 ml divinyldimethyl silane were then added to the reaction vessel. The reaction vessel was agitated for 1 hour at room temperature. The catalyst product was dried under a nitrogen atmosphere and stored. The surface-treated solid titanium catalyst contained 2.5 percent by weight Ti.

Step 5: Prepolymerization

A 0.5-liter high pressure reaction vessel was washed with propylene followed by the addition of 2 g of the catalyst produced in Step 4, 300 ml hexane, 6 mmol triethylaluminum, and 20 ml polydimethylsiloxane (H$_2$C=CH—Si(CH$_3$)$_2$—O—Si(CH$_3$)$_2$—CH=CH$_2$). The polymerization reaction was performed at an ethylene pressure of 0.9 atm for 5 hours at 20° C. The amount of macromonomers polymerized around the catalyst was 31.0 g per g of catalyst.

Step 6: Polymerization

A 2-liter high pressure reaction vessel was washed with propylene. 20 mg of the prepolymerized catalyst prepared in Step 5, contained in a glass bottle, was placed in the reaction vessel. The reaction vessel was filled with nitrogen and evacuated three times then filled with nitrogen to a pressure of 1 atm. 7 mmol triethylaluminum, 0.5 mmol dicyclopentyldimethoxy silane, and 0.5 mmol diisopropyldimethoxy silane were added to the reaction vessel. 300 Nml of hydrogen was then added followed by 1,200 ml liquid propylene. The temperature was raised to 65° C. and the polymerization reaction was conducted for 1 hour under agitation. After completion of the polymerization reaction, the reaction vessel was vented and cooled to room temperature and then dismantled. The polymer product was collected and dried in a vacuum oven for more than 6 hours at 50° C. A white polymer product was obtained.

Step 7: Measurement of the Melt Strength

The polymer prepared in Step 6 was was extruded at 220° C. through a die using a Brabender extruder. The melt strength of the extruded polymer was measured in-line with a Reotense (QötFerster, Germany). Results are shown in Table I. The diameter of the die was 2 mm and the distance from the entrance of the die to Reotense roller was 10 cm.

EXAMPLE 2

The method and components of this example are identical to Example 1 with the exception of the vinyl-terminated polysiloxane compound used during the prepolymerization reaction of the macromonomers. In this example, the vinyl-terminated polysiloxane used was (H$_2$C=CH—Si(CH$_3$)$_2$—O—(Si(CH$_3$)$_2$—O)$_3$—Si(CH$_3$)$_2$—CH=CH$_2$). The melt strength of the polymer prepared in this example is shown in Table I.

EXAMPLE 3

The method and components of this example are identical to Example 1 with the exception of the vinyl-terminated polysiloxane compound used during the prepolymerization reaction of the macromonomers. In this example, the vinyl-terminated polysiloxane used was (H$_2$C=CH—Si(CH$_3$)$_2$—O—(Si(CH$_3$)$_2$—O)$_5$—Si(CH$_3$)$_2$—CH=CH$_2$). The melt strength of the polymer prepared in this example is shown in Table I.

EXAMPLE 4

The method and components of this example are identical to Example 1 with the exception of the vinyl-terminated polysiloxane compound used during the prepolymerization reaction of the macromonomers. In this example, the vinyl-terminated polysiloxane used was (H$_2$C=CH—Si(CH$_3$)$_2$—O—(Si(CH$_3$)$_2$—O)$_{21}$—Si(CH$_3$)$_2$—CH=CH$_2$). The melt strength of the polymer prepared in this example is in Table I.

EXAMPLE 5

The method and components of this example are identical to Example 1 with the exception of the vinyl-terminated polysiloxane compound used during the prepolymerization reaction of the macromonomers. In this example, the vinyl-terminated polysiloxane used was (H$_2$C=CH—Si(CH$_3$)$_2$—O—(Si(CH$_3$)$_2$—O)$_{35}$—Si(CH$_3$)$_2$—CH=CH$_2$). The melt strength of the polymer prepared in this example is shown in Table I.

EXAMPLE 6

The method and components of this example are identical to Example 1 with the exception of the vinyl-terminated polysiloxane compound used during the prepolymerization reaction of the macromonomers. In this example, the vinyl-terminated polysiloxane used was (H$_2$C=CH—Si(CH$_3$)$_2$—O—(Si(CH$_3$)$_2$—O)$_{52}$—Si(CH$_3$)$_2$—CH=CH$_2$). The melt strength of the polymer prepared in this example is shown in Table I.

EXAMPLE 7

The method and components of this example are identical to Example 1 except that 1000 Nml of hydrogen was added during the prepolymerization reaction of the macromonomers. The melt strength of the polymer prepared in this example is shown in Table I.

EXAMPLE 8

The method and components of this example are identical to Example 1 except that 50 Nml of hydrogen was added during the prepolymerization reaction of the macromonomers. The melt strength of the polymer prepared in this example is shown in Table I.

EXAMPLE 9

The method and components of this example are identical to Example 1 except that propylene monomer was used instead of ethylene monomer during the prepolymerization reaction of the macromonomers. The melt strength of the polymer prepared in this example is shown in Table I.

COMPARATIVE EXAMPLE 1

The method and components of this example are identical to Example 1 except that the prepolymerization reaction of the macromonomers was not performed. The melt strength of the polymer prepared in this example is shown in Table I.

TABLE 1

|  | Polymerization activity (kg-PP/g-cat) | MI (g-PP/10 min) | Melt strength (mN) |
|---|---|---|---|
| Example 1 | 32 | 0.8 | 172 |
| Example 2 | 32 | 0.9 | 143 |
| Example 3 | 30 | 1.1 | 121 |
| Example 4 | 29 | 1.4 | 97 |
| Example 5 | 28 | 1.4 | 84 |
| Example 6 | 28 | 1.4 | 75 |
| Example 7 | 34 | 1.9 | 142 |
| Example 8 | 26 | 0.2 | 212 |
| Comparative example 1 | 36 | 1.5 | 40 |

As shown by the examples above and the comparative example, the melt strength of the polymer can be increased without causing large changes in polymerization activity when using the polymerization method including the prepolymerized catalyst of the present invention compared with the polymerization method using a conventional catalyst.

Accordingly, the catalyst and method of the present invention for olefin polymerization may produce a polyolefin with a melt strength suitable for use in processes carried out in the melt state such as foaming, heat shaping, and extrusion coating.

What is claimed is:

1. A prepolymerized olefin polymerization catalyst encapsulated with macromonomers wherein the prepolymerized catalyst is prepared by polymerization of an olefin monomer and a vinyl-terminated polysiloxane compound in the presence of a solid titanium olefin polymerization catalyst wherein the solid titanium catalyst is prepared by surface treating a compound comprising a magnesium compound, a titanium compound, and an electron donor with a silane compound having two or more vinyl groups.

2. The prepolymerized olefin polymerization catalyst of claim 1, wherein the silane compound having two or more vinyl groups comprises divinyldimethylsilane, divinyldiphenylsilane, divinyldiethylsilane, divinyldiisobutylsilane, or divinyldihydridesilane.

3. The prepolymerized olefin polymerization catalyst of claim 1, wherein the amount of the silane compound having two or more vinyl groups is 2–200 moles per mole of magnesium compound.

4. The prepolymerized olefin polymerization catalyst of claim 1, wherein the compound comprising a magnesium compound, a titanium compound, and an electron donor is prepared by the method comprising:

(i) preparing a solution of the magnesium compound by dissolving the magnesium compound in the electron donor;

(ii) reacting the magnesium solution with a transition metal compound, a silicon compound, a tin compound, or a mixture thereof and thereby precipitating solid particles; and (iii) reacting the precipitated solid particles with a titanium compound and an electron donor.

5. The prepolymerized olefin polymerization catalyst of claim 1, wherein the olefin monomer used in the prepolymerization step comprises one or more monomers selected from the group consisting of ethylene, propylene, 1-butene, 1-hexene, and 1-octene.

6. The prepolymerized olefin polymerization catalyst of claim 1, wherein the vinyl-terminated polysiloxane compound has the structure:

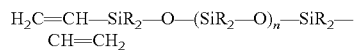

(n=0–100, R=alkyl, alkoxy, hydrogen, or phenyl).

7. The prepolymerized olefin polymerization catalyst of claim 1, wherein the macromonomers encapsulating the prepolymerized catalyst have a weight average molecular weight in the range of 500–100,000, and comprise 1–99% by weight olefin, 0.01–10% by weight vinyl-terminated polysiloxane compound, and 0.001–1% by weight silane material from the silane compound having two or more vinyl groups.

8. A method of olefin polymerization comprising contacting olefin with a catalyst system wherein the catalyst system comprises:

(i) a prepolymerized olefin polymerization catalyst encapsulated with macromonomers wherein the prepolymerized catalyst is prepared by polymerization of an olefin monomer and a vinyl-terminated polysiloxane compound in the presence of a solid titanium olefin polymerization catalyst wherein the solid titanium catalyst is prepared by surface treating a compound comprising a magnesium compound, a titanium compounds and an electron donor with a silane compound having two or more vinyl groups;

(ii) an organometallic compound comprising a metal of Group I or Group III of the Periodic Table; and (iii) an external electron donor.

9. The method of olefin polymerization of claim 8, wherein the organometallic compound comprises a trialkylaluminum compound.

10. The method of olefin polymerization of claim 8, wherein the external electron donor comprises an alkoxy silane compound.

11. The method of olefin polymerization of claim 8, wherein the silane compound having two or more vinyl groups comprises divinyldimethylsilane, divinyldiphenylsilane, divinyldiethylsilane, divinyldiisobutylsilane, or divinyldihydridesilane.

12. The method of olefin polymerization of claim 8, wherein the amount of the silane compound having two or more vinyl groups is 2–200 moles per mole of magnesium compound.

13. The method of olefin polymerization of claim 8, wherein the compound comprising a magnesium compound, a titanium compound, and an electron donor is prepared by the method comprising:
  (i) preparing a solution of the magnesium compound by dissolving the magnesium compound in the electron donor;
  (ii) reacting the magnesium solution with a transition metal compound, a silicon compound, a tin compound, or a mixture thereof and thereby precipitating solid particles; and
  (iii) reacting the precipitated solid particles with a titanium compound and an electron donor.

14. The method of olefin polymerization of claim 8, wherein the olefin monomer used in the prepolymerization step comprises one or more monomers selected from the group consisting of ethylene, propylene, 1-butene, 1-hexene, and 1-octene.

15. The method of olefin polymerization of claim 8, wherein the vinyl-terminated polysiloxane compound has the structure:

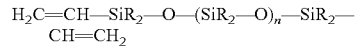

(n=0–100, R=alkyl, alkoxy, hydrogen, or phenyl).

16. The method of olefin polymerization of claim 8, wherein the macromonomers encapsulating the prepolymerized catalyst have a weight average molecular weight in the range of 500–100,000, and comprise 1–99% by weight olefin, 0.01–10% by weight vinyl-terminated polysiloxane compound, and 0.001–1% by weight silane material from the silane compound having two or more vinyl groups.

* * * * *